(12) United States Patent
Gorny

(10) Patent No.: US 10,963,122 B2
(45) Date of Patent: *Mar. 30, 2021

(54) SYSTEM AND METHOD OF COMMUNICATION ANALYSIS

(71) Applicant: Nextiva, Inc., Scottsdale, AZ (US)

(72) Inventor: Tomas Gorny, Scottsdale, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/783,066

(22) Filed: Feb. 5, 2020

(65) Prior Publication Data
US 2020/0174627 A1 Jun. 4, 2020

Related U.S. Application Data

(63) Continuation of application No. 16/425,601, filed on May 29, 2019, now Pat. No. 10,558,318, which is a (Continued)

(51) Int. Cl.
*H04M 3/51* (2006.01)
*H04W 24/10* (2009.01)
*H04L 12/26* (2006.01)
*H04W 24/08* (2009.01)
*G06F 3/0481* (2013.01)
(Continued)

(52) U.S. Cl.
CPC ........ *G06F 3/0481* (2013.01); *G06F 3/04845* (2013.01); *G06F 40/186* (2020.01); *G06Q 30/02* (2013.01); *H04L 41/18* (2013.01); *H04L 41/22* (2013.01); *H04L 43/045* (2013.01); *H04M 3/42068* (2013.01); *H04M 3/5133* (2013.01); *H04W 24/08* (2013.01); *H04W 24/10* (2013.01);
(Continued)

(58) Field of Classification Search
CPC .... H04W 24/10; H04W 24/08; H04L 43/045; H04M 3/22
USPC .............. 370/252; 379/265.06, 242, 265.07, 379/266.1, 265.05, 265.03, 265.01
See application file for complete search history.

(56) References Cited

U.S. PATENT DOCUMENTS 6,707,904 B1 3/2004 Judkins et al.
7,818,195 B2 10/2010 Coon et al.
(Continued)

FOREIGN PATENT DOCUMENTS

EP 0644510 3/1995

OTHER PUBLICATIONS

European Search Report for Application No. EP 16804225 dated Dec. 10, 2018. 1 Page.

*Primary Examiner* — Thjuan K Addy
(74) *Attorney, Agent, or Firm* — Spencer Fane LLP; Steven J. Laureanti

(57) ABSTRACT

A system and method for a communication analytics system comprises a communication device and a system analyzer and the system analyzer is configured to continuously monitor electronic communications over the one or more communication devices and identify one or more communication activities associated with the electronic communications. The system analyzer is further configured to translate the one or more communication activities into communication data, store the communication data in a database and identify one or more correlations from the communication data.

20 Claims, 10 Drawing Sheets

Related U.S. Application Data continuation of application No. 16/180,255, filed on Nov. 5, 2018, now Pat. No. 10,218,098, which is a continuation of application No. 15/168,636, filed on May 31, 2016, now Pat. No. 10,133,440.

(60) Provisional application No. 62/169,215, filed on Jun. 1, 2015.

(51) Int. Cl.
| | | |
|---|---|---|
| *G06F 3/0484* | (2013.01) | |
| *H04L 12/24* | (2006.01) | |
| *H04M 3/42* | (2006.01) | |
| *G06F 40/186* | (2020.01) | |
| *G06Q 30/02* | (2012.01) | |

(52) U.S. Cl.
CPC .. *H04M 3/42348* (2013.01); *H04M 2203/558* (2013.01)

(56) References Cited

U.S. PATENT DOCUMENTS

| | | |
|---|---|---|
| 7,903,806 B1 | 3/2011 | Pester, III |
| 8,064,898 B2 | 11/2011 | Canall |
| 8,503,991 B2 | 8/2013 | Swift et al. |
| 9,955,332 B2 | 4/2018 | Raleigh et al. |
| 10,123,063 B1 | 11/2018 | Brown |
| 10,417,613 B1 * | 9/2019 | Brisebois ........... G06Q 10/1095 |
| 2010/0330960 A1 | 12/2010 | Ravishankar et al. |

\* cited by examiner

FIG. 7C

| Dashboard | Wallboards | Scorecards | Gamification | Custom | Reporting | Monitoring | Analytics | Saved | Settings | Hi XBert Nextiva |

This week (rounded) - now

Users ▼ | Filter Users ▼ | Summary ▼ swap  export

| TOTALS | Mike Williams | Bobby Murphy | Sam Smith | Shauna Smith |
|---|---|---|---|---|
| Total | 522 | 164 | 162 | 161 |
| Total talk time | 2d 17h37m52s | 1d 6h57m22s | 1d 3h24m34s | 1d 5h42m35s |
| Average talk time | 7m32s | 11m19s | 10m9s | 11m4s |
| Longest Duration | 12m8s | 59m49s | 44m10s | 59m50s |
| Unique dials | 94 | 98 | 94 | 104 |
| Unique call ratio | 0.18 | 0.6 | 0.58 | 0.65 | swap  export

| INBOUND CALLS | Mike Williams | Bobby Murphy | Sam Smith | Shauna Smith |
|---|---|---|---|---|
| Inbound | 261 | 105 | 110 | 110 |
| Missed | 261 | 8 | 6 | 8 |
| Avg. Inbound talk time | 3m46s | 8m10s | 7m34s | 8m4s |

SYSTEM AND METHOD OF COMMUNICATION ANALYSIS

CROSS-REFERENCE TO RELATED APPLICATIONS

This application is a continuation of U.S. patent application Ser. No. 16/425,601, filed on May 29, 2019, entitled "System and Method of Communication Analysis," which is a continuation of U.S. patent application Ser. No. 16/180,255, filed on Nov. 5, 2018, entitled "System and Method of Communication Analysis," now U.S. Pat. No. 10,218,098, which is a continuation of U.S. patent application Ser. No. 15/168,636, filed on May 31, 2016, entitled "System and Method of Communication Analysis," now U.S. Pat. No. 10,133,440, which claims the benefit under 35 U.S.C. § 119(e) to U.S. Provisional Application No. 62/169,215, filed Jun. 1, 2015, and entitled "System and Method of a User Interface System." The subject matter disclosed in U.S. patent application Ser. No. 16/425,601, U.S. Pat. Nos. 10,218,098, 10,133,440, and U.S. Provisional Application No. 62/169,215 is hereby incorporated by reference into the present disclosure as if fully set forth herein.

TECHNICAL FIELD

The present disclosure relates generally to a system and a method of communication analysis and specifically to a system and method of communication analysis for a telecommunication system.

BACKGROUND

Businesses require communication to thrive. Whether with customers, suppliers, or various entities within or without the business, a typical business can expect tens, hundreds, or thousands of telephone calls per day. Although some businesses log the identity of the caller, the recipient, the time of the call, and/or the duration, few if any businesses leverage this information or fully integrate the collection of information with other processes or technologies. For a normal-sized business, collecting this information, storing it, extracting it, and building correlations is simply impossible owing to the cost of storing big data and the complexity of the systems necessary to carry out these foregoing tasks.

Prior art systems have been unable to create interfaces that are cost-effective or feature-rich, while maintaining an easy-to-use interface. The lack of a cost-effective or well-designed communication analysis system and method is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
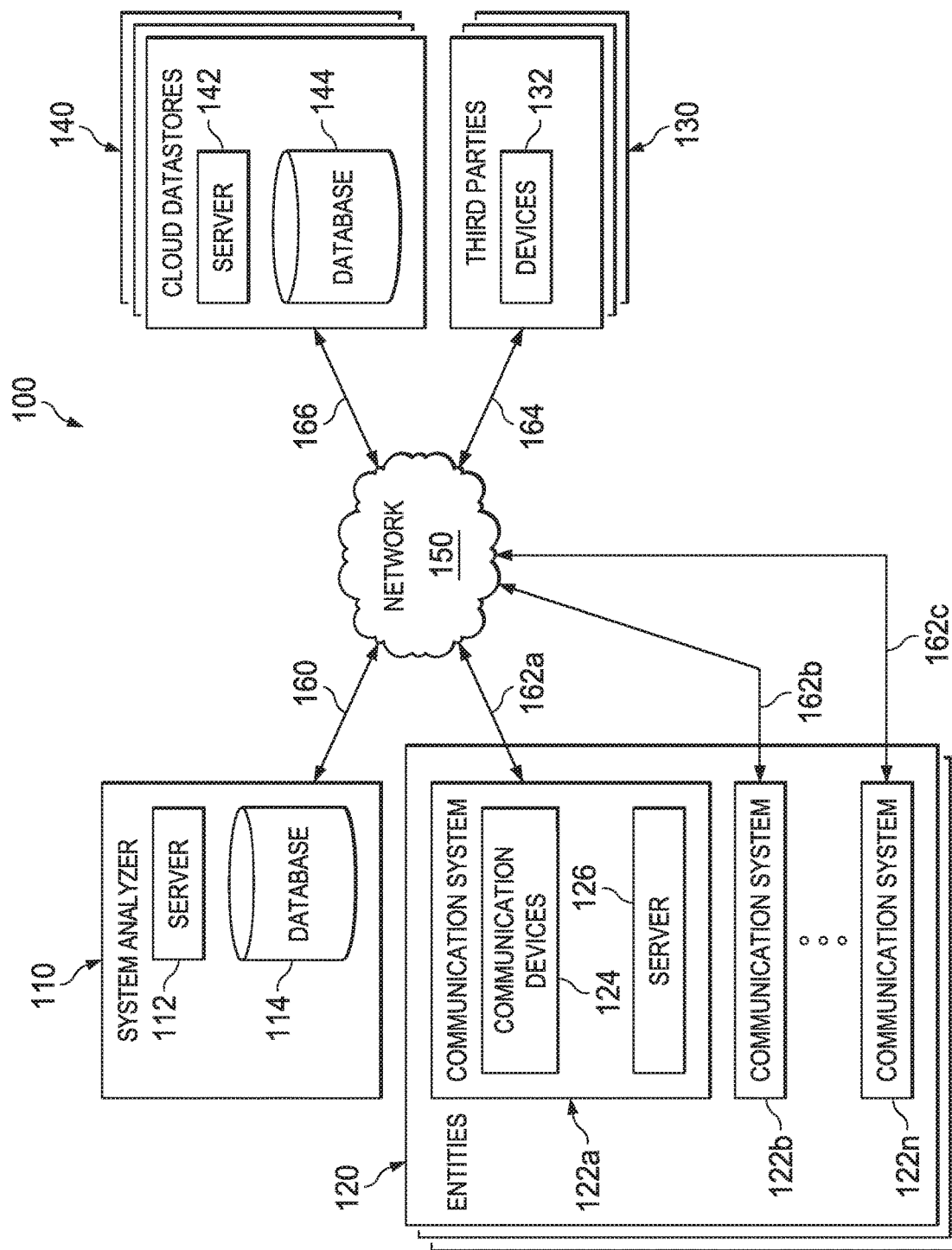
FIG. 1 illustrates a communication analytics system according to a preferred embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates an exemplary communication analytics system 100, according to a preferred embodiment. Communication analytics system 100 comprises system analyzer 110, communication systems 122a-122n, one or more entities 120, one or more third parties 130, cloud datastore 140, a network 150, and communication links 160, 162a-162n, 164 and 166. Although a single system analyzer 110, one or more entities 120, one or more third parties 130, a single cloud datastore 140, a single network 150, and communication links 160, 162a-162n, 164 and 166 are shown and described; embodiments contemplate any number of system analyzers, entities, third parties, cloud datastores, networks, or communication links, according to particular needs.

In one embodiment, system analyzer 110 comprises server 112 and database 114. Server 112 is programmed to monitor and analyze communication activity, such as, for example, telephone calls, between one or more entities 120 and one or more third parties 130. As an example only and not by way of limitation, communication activity may comprise, any activity associated with communications to or from one or more entities 120, including sending and receiving telephone calls, emails, instant, chat or text messaging, posting to social media, blogs, or newsgroups, and any other communications to or from one or more entities 120. As an example only and not by way of limitation, system analyzer 110 may be programmed to monitor telephone calls to and from one or more entities 120, analyze any data associated with the telephone calls (such as time of telephone call, identity of caller or recipient, length of telephone call, and the like), and store the data in database 114. Database 114 comprises one or more databases or other data storage arrangements at one or more locations, local to, or remote from, system analyzer 110. In one embodiment, one or more databases 114 is coupled with one or more servers 112 using one or more local area networks (LANs), metropolitan area networks (MANs), wide area networks (WANs), network 150, such as, for example, the Internet, or any other appropriate wire line, wireless, or any other communication links. Database 114 stores data that is made available and may be used by servers 112 according to the operation of communication analytics system 100.

Figure 2:
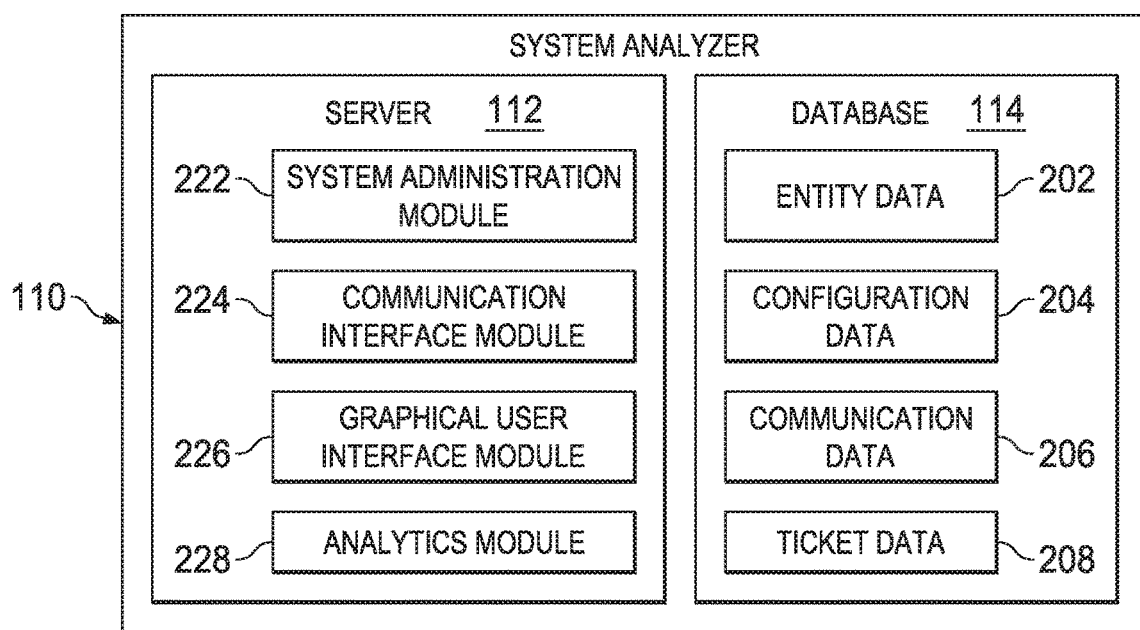
FIG. 2 illustrates the system analyzer of FIG. 1 according to an embodiment.

System analyzer 110 monitors the communication activity of communication devices 124 and stores monitored communication activity as communication data 206 in database 114 (see FIG. 2). Communication data 206 may be collected by system analyzer 110 and may comprise, for example, the time of a telephone call, the person that initiated the telephone call, the elapsed time of the call, and other data associated with the communication activity, as discussed herein. By collecting communication data 206, system analyzer 110 improves and automates telecommunication system decisions and performance. According to embodiments, system analyzer 110 automates tasks such as generating system and sales force reports, keeping track of employees' time utilization, responding to customer service and support, and other telecommunication and sales services by integrating customer resource management (CRM) information with collected communication data 206. Embodiments of system analyzer 110 may be tailored to call center environments, professional office organizations, or any other type of business entity, as explained in more detail in the following disclosure.

In order to explain the operation of system analyzer 110, two examples are now given. In the first example, system analyzer 110 monitors telephone traffic at a customer service call center and generates reports detailing, for example, the average wait time of a customer, the length of time it takes to resolve a customer problem, which customer service representatives are most effective at resolving a customer problem, and the like. In addition, or as an alternative, system analyzer 110 may correlate the telephone traffic with other database information, such as telephone log data, telephone call data, CRM data, or the like. In a second example, system analyzer 110 monitors email traffic at a real estate office, analyzes the ingoing and outgoing emails, and determines, for example, a priority of potential clients that need to be contacted (for example, a list of clients that each real estate agent needs to call and on which days to call), the average response time to a client inquiry, demographics of potential clients, or any other like information that may be determined from monitoring email traffic and correlating the email traffic with other database information, such as, for example telephone log data, CRM data, real estate listing data, or the like. Although, a customer service call center and a real estate office are described as entities; embodiments contemplate any type of entity having any type of communication activity, according to particular needs.

In one embodiment, one or more entities 120 may comprise a business, company, enterprise, distributor, retailer, call-center, CRM specialist system, customer service system, help desk system, telephone or media service, social media service, or any entity that sends or receives communications, such as, for example, to and from one or more third parties 130. According to some embodiments, one or more entities 120 comprise a provider of communication services such as an email service provider, Voice over Internet Protocol (VOIP) or telephony provider, or any telecommunications entity.

One or more entities 120 comprise one or more communication systems 122a-122n and send or receive communications to and from one or more third parties 130 using one or more communication systems 122a-122n. Communication systems 122a-122n may comprise communication devices 124 and server 126, and include any system located at one or more entities 120 that is configured to send and receive communications. Each communication device 124 may provide one or more entities 120 a communication channel between one or more entities 120 and third parties 130. One or more entities 120 may be coupled to third parties 130 by network 150 via communication links 162a-162n and 164. The one or more entities 120 may utilize communication analytics system 100 in order to monitor, score, and analyze the interactions and communications among communication systems 122a-122n within a single entity 120, among end user system 122a-122n located in one or more entities 120, and between communication systems 122a-122n and one or more third parties 130.

In an embodiment, one or more third parties 130 may be any party that communicates with one or more entities 120 and may comprise one or more devices 132. One or more third parties 130 may be, for example, a customer, a client, a supplier, another entity or any party that sends or receives communications to and from one or more entities 120.

According to an embodiment, when one or more third parties 130 sends communications to or receives communications from one or more entities 120, system analyzer 120 monitors and analyzes the communication activity and leverages the collected communication data 206 to improve services of the one or more entities 120 to the one or more third parties 130. For example, and as discussed above, if a customer calls a customer service call center, system analyzer 110 may identify the nature of the customer's service request and identify the customer service representative that is most effective at resolving the service request. According to other embodiments, system analyzer 110 provides analytics to the entity of the customer service representatives showing, for example, the average time the customer service representative takes to resolve a customer problem. In addition, or as an alternative, system analyzer 110 may provide a gamification feature, such that the customer service representatives may compete with each other to improve the average time to resolve customer service requests, thereby improving customer service.

Cloud datastore 140 may comprise server 142 and database 144. Cloud datastores 140 provide for the storage of data and hosting of programs or applications. According to embodiments, server 142 of cloud datastores 140 may host and run one or more runtime processes associated with system administration module 222, interface module 224, and analytics module 228. Database 144 may store any data of communication analytics system 100, including entity data 202, configuration data 204, communication data 206, and ticket data 208 (see FIG. 2) for data storage and retrieval, and may include one or more processes for managing and sharing data among system analyzer 110, one or more entities 120, one or more third parties 130, and cloud datastore 140.

System analyzer 110 including server 112 and database 114 is coupled with network 150 using communication link 160, which may be any wireline, wireless, or other link suitable to support data communications between system analyzer 110 and network 150. One or more entities 120 are coupled with network 150 using communication links 162a-162n, which may be any wireline, wireless, or other link suitable to support data communications between one or more entities 120 and network 150. One or more third parties 130 may be coupled with network 150 using communication link 164, which may be any wireless or other link suitable to support data communications between one or more entities 130 and network 150. Cloud datastore 140 may be coupled with network 150 using communication link 166, which may be any wireless or other link suitable to support data communications between cloud datastore 140 and network 150.

Although communication links 160, 162a-156n, 164, and 166 are shown as generally coupling system analyzer 110, one or more entities 120, one or more third parties 130, and cloud datastore 140 with network 150; embodiments contemplate system analyzer 110, one or more entities 120, one or more third parties 130, and cloud datastore 140 communicating directly with each other, according to particular needs.

In an embodiment, network 150 includes the Internet, telephone lines, any appropriate local area networks LANs, MANs, or WANs, and any other communication network coupling system analyzer 110, one or more entities 120, one or more third parties 130, and cloud datastore 140. For example, data may be maintained by system analyzer 110 or at one or more locations external to system analyzer 110 and/or made available to system analyzer 110, one or more entities 120, one or more third parties 130, and cloud datastore 140 using network 150 or in any other appropriate manner. Those skilled in the art will recognize that the complete structure and operation of communication network 150 and other components within communication analytics system 100 are not depicted or described. Embodiments may be employed in conjunction with known communications networks and other components.

In one embodiment, system analyzer 110, one or more entities 120, one or more third parties 130, and cloud datastore 140 may each operate on one or more computers or computer systems that are integral to or separate from the hardware and/or software that support communication analytics system 100. In addition or as an alternative, one or more users, such as end users or agents, may be associated with communication analytics system 100 including system analyzer 110, one or more entities 120, one or more third parties 130, and cloud datastore 140. These one or more users may include, for example, one or more computers programmed to autonomously configure, manage, and provide communications between system analyzer 110, one or more entities 120, one or more third parties 130, and cloud datastore 140 and/or one or more related tasks within communication analytics system 100. As used herein, the term "computer" or "computer system" includes any suitable input device, such as a keypad, mouse, touch module, microphone, or other device to input information. Any suitable output device that may convey information associated with the operation of communication analytics system 100, including digital or analog data, visual information, or audio information. Furthermore, the computer includes any suitable fixed or removable non-transitory computer-readable storage media, such as magnetic computer disks, CD-ROM, or other suitable media to receive output from and provide input to communication analytics system 100. The computer also includes one or more processors and associated memory to execute instructions and manipulate information according to the operation of communication analytics system 100.

In one embodiment, and as discussed in more detail below, communication analytics system 100 provides a graphical user interface 600 for monitoring, storing, and analyzing communication activity. According to embodiments, system analyzer 110 parses communication activity according to predetermined criteria and identifies goals or trends from communication data 206. For example, graphical user interface 700 (FIG. 7) of communication analytics system 100 provides interface tools that analyze communication activity and simplify generating reports and identifying trends in communication activity. For example, as illustrated in FIG. 7, graphical user interface 700 provides tools that monitor telephone statistics for one or more customer support agents and generates a report of the effectiveness of customer support, such as the total number of calls, the total talk time, the inbound call count, the inbound talk time, the outbound call count, the outbound talk time, the toll free call count, the toll free talk time, the international call count, the international talk time, the missed call count, the unique call count, the unique call ratio and the like. Although a particular report including exemplary communication activity is shown and described, embodiments contemplate any communication activity, according to particular needs.

FIG. 2 illustrates system analyzer 110 of FIG. 1 in greater detail, according to an embodiment. System analyzer 110 comprises server 112 and database 114. Server 112 comprises system administration module 222, communication interface module 224, graphical user interface module 226, and analytics module 228. Database 114 comprises entity data 202, configuration data 204, communication data 206, and ticket data 208. Although, system administration module 222, communication interface module 224, graphical user interface module 226, analytics module 228, entity data 202, configuration data 204, communication data 206, and ticket data 208 are shown and described; embodiments contemplate any suitable configuration of data and modules, according to particular needs.

System analyzer 110 monitors communication activity sent to and received from end user system 122a-122n. System analyzer 110 uses one or more hardware or software components to monitor telephone calls, record elapsed talk time, identify telephone caller, and offload such communication data 206 to database 114. According to some embodiments, system analyzer 110 monitors all communication activity among communication systems 122a-122n and between communication systems 122a-122n and one or more third parties 130. Most businesses are not able to log communication activity because the amount of data storage is too large and the technical requirements are too high. Instead, they may collect only the minimum amount of information required by law. Properly monitoring all communication activity over various channels is complicated to implement because communication types are so varied, and may include telephone calls, instant messaging, faxes, emails, text messaging (SMS), or other like wireless or wired voice, text, or data communication.

System administration module 222 of server 112 may perform system administration tasks associated with communication analytics system 100. For example, system administration module 222 may provide one or more system services to setup or configure the operation of communication analytics system 100, such as, controlling execution of modules and storage of data, including controlling the location of the storage of data. This may include setting up a telephone system or VOIP system to be monitored by system administration module 222 and configuring the type of communication activity that will be monitored and what communication data 206 will be collected and stored. Embodiments contemplate a user-configurable communication analytics system 100, such that the various modules or data may be stored either singularly or redundantly on system analyzer 110, one or more entities 120, and/or cloud datastores 140, according to particular needs. In addition, or as an alternative, system administration module 222 receives, processes, updates, creates, and stores entity data 202, configuration data 204, communication data 206, and ticket data 208.

According to some embodiments, system administration module 222 of server 112 provides a data sorting, retrieval, duplication, backup, creation and/or interface manager for data stored in database 114 to efficiently provide data to end user system 120a-120n and entities 130 and manage the data generated from various components of communication analytics system 100 that are stored in database 114. According to some embodiments, system administration module 222 organizes and stores the various types of data generated from communication analytics system 100 to provide real-time use of the data on database 114 to operate communication analytics system 100.

Communication interface module 224 of server 112 generates, receives, and monitors communication between one or more communication systems 122a-122n and among one or more third parties 130. Communication interface module 224 may comprise one or more telephone systems, instant messaging systems, voice over internet protocol (VOIP) systems, email systems, internet or web-based chat systems, and/or other types of communication systems used for allowing an end user system 122a-122n to communicate with each other and/or one or more third parties 130. Communication interface module 224 may comprise or couple with a communication system, which initiates or receives communication activity over communication channels to communication devices 124 of communication systems 122a-122n. For example, communication interface module 224 may comprise a VOIP software-based telephone system that automatically records communication activity that occurs over the VOIP communications. This may include recording the time, duration, date, voice, text, and other communication activity transmitted over the VOIP channel. Although described as a VOIP telephone system, communication interface module 224 may comprise any suitable hardware or software that monitors communication activity. In some embodiments, the communication activity recorded by communication interface module 224 is stored in communication data 204.

Graphical user interface module 226 of server 112 generates a graphical user interface, such as graphical user interface 600 (FIG. 6), described in more detail below, for configuring, monitoring, and interpreting communication activity. According to embodiments, various features of graphical user interface module 226 include generating charts, storing and retrieving communication data 206, displaying notifications, and creating and managing reports as illustrated in connection with FIGS. 6-9 below. Graphical user interface module 226 retrieves data from database 114 including entity data 202, configuration data 204, communication data 206, and ticket data 208 and manages, sorts, and displays the data as illustrated below.

Analytics module 228 of server 112 may analyze, calculate, and display data according to one or more selections made by a user. Analytics module 228 may comprise one or more charting, graphing, display, or analysis systems that generate results according to selected criteria. For example, analytics module 228 may generate dashboards, charts, or reports of communication information stored in communication analytics system 100. According to some embodiments, analytics module 228 provides gamification of system data so that agents may be encouraged to compete with other agents to improve on communication metrics. For example, call center agents may be provided a dashboard that provides simplified statistics of their call performance, as illustrated in FIGS. 7A-7D. Based on these statistics, call center agents may compete with each other or against a goal to improve their performance, such as, for example, answering more calls per hour, decreasing the amount of time to resolve a customer complaint, and the like.

Entity data 202 of database 114 describes the identification information of entities 120 of communication analytics system 100. Entity data 202 comprises any suitable identification information and may comprise, for example, names, addresses, company, telephone numbers, email, IP addresses, and the like. Entity data 202 may be used by system administration module 222 to identify one or more entities 120 in communication analytics system 100 to generate particular configurations of communication analytics system 100 specific to each of the one or more entities 120. For example, where one or more entities 120 comprises departments, call groups, users, locations, agents, employee roles, or telephone numbers, the identification information stored in entity data 202 permits system analyzer 110 to generate a particularized graphical user interface 600 (FIG. 6), report, chart, graph, or identify tends or goals specific to the identified or selected departments, call groups, users, locations, agents, employee roles, or telephone numbers, according to particular needs. In addition, or as an alternative, system administration module 222 may provide a particularized graphical user interface 600 specific to the industry of entity 120, the types of customers served by entity 120, and/or the types of products sold by entity 120. For example, particularized graphical user interfaces may comprise a different arrangement of elements on graphical user interface 600. In one embodiment, the particularized graphical user interfaces are stored in, for example, configuration data 204.

In one embodiment, configuration data 204 comprises data, which describes the various functionalities of communication analytics system 100 useful to each of entities 120. In one embodiment, configuration data 204 comprises, for example, location data that describes where the data is generated or received by each module of system analyzer 110. In another embodiment, configuration data 204 additionally comprises settings and parameters that describe the system-level functioning of communication analytics system 100.

Communication data 206 stored on database 114 of system analyzer 110 may comprise communication activity of communication devices 124 and any setup information of communication interface 224. According to some embodiments, communication data 206 comprises the particular communication channels, which are open to a particular end user system 120a-120n or entity 120, the times, which the communication channels are open, the protocols or metadata that describe the communication, and/or any other configuration and setup data necessary to configure the communication systems.

According to some embodiments, communication data 206 comprises information about each communication, such as, for example, which end user system 120a-120n, entity 120, third party 130, or user, from which the call originated and/or to whom the call was placed or transferred. System analyzer 110 may automatically collect data with every communication activity, and associate a time stamp with each action. System analyzer 110 may correlate information of identifying communication systems 122a-122n or third parties 130 associated with the communication with a database of user information, such that the system analyzer 110 identifies employees, users, current or potential customers, user roles, business, or other identity information associated with the communication. Each user or communication may be associated with a role, entity, end user system, department, call group, location, agent, or telephone number. A role may comprise, for example, a job, position, employment status, or the like.

Figure 5:
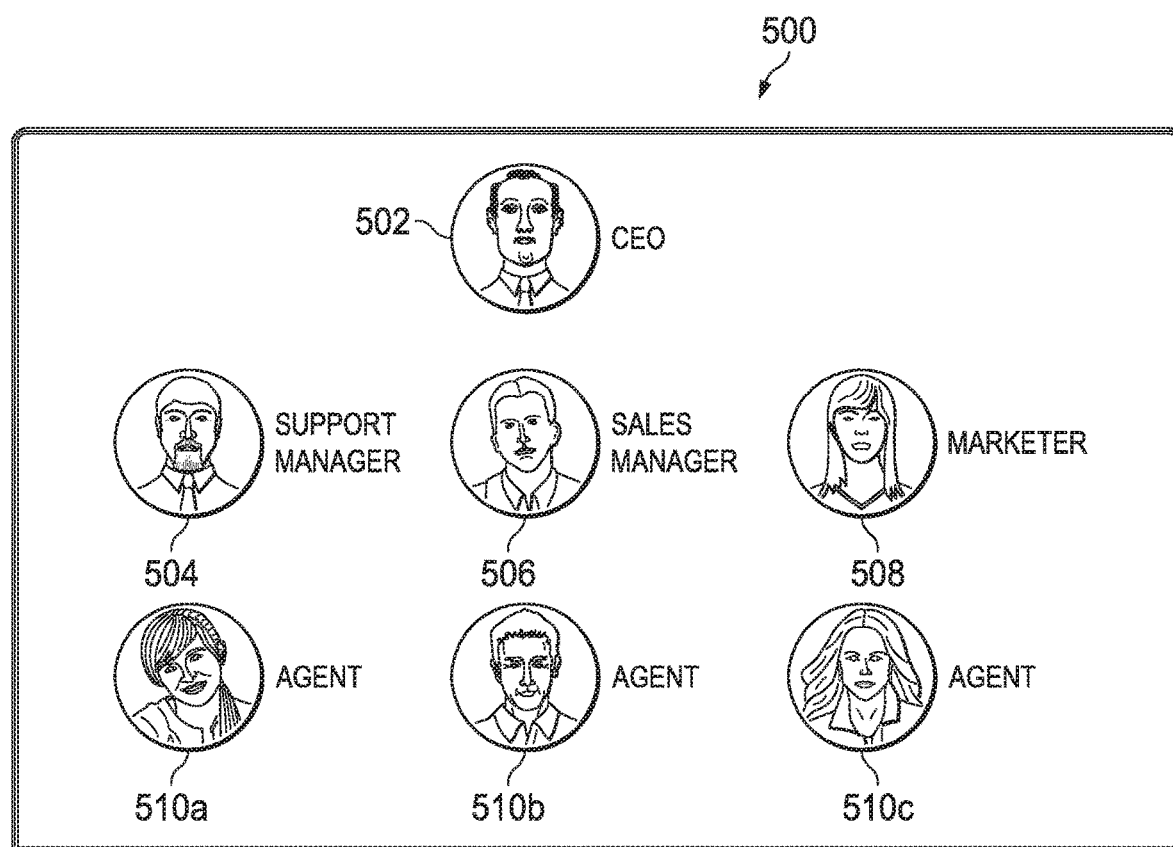
FIG. 5 illustrates a hierarchy of end users.

For example, FIG. 5 illustrates roles in an exemplary entity 120. According to some embodiments, communication data 206 comprises any information parsed from communication activity including, but not limited to: telephone call duration, identity of telephone caller, identity of telephone call receiver, time call began or ended, a service request associated with the telephone call, the number of previous times a third party has called, the length of time that it took to return a third party inquiry or problem, or any other like information. Although described in connection with a telephone system, communication data 206 may comprise communication data 206 from any communication system, such as for example, emails, chat transcripts, social media communications, information extracted from third-party integrations (to, for example, CRM's billing systems, or lead-tracking tools), voicemails, scanned physical mail, or the like.

Ticket data 208 may comprise data generated by tickets of communication analytics system 100. In one embodiment, ticket data 208 includes, but is not limited to: an identity of the representative of entities 120 which created the ticket, end user system 120a-120n or a company to which the ticket relates, the channel by which a third party 130 contacted the representative of one or more entities 120, the number of contacts between one or more entities 120 and one or more third parties 130 (historically or for a given amount of time), the total time spent by end user system 120a-120n on each channel, the cost of an end user system 120a-120n to one or more entities 120, the time and date of the ticket creation, a topic and information shared during the contact between one or more entities 120 and one or more third parties 130, and/or the like.

Aspects of the current invention include a productivity tool to monitor and analyze business communications and predict trends to help decision making and business improvement. According to some embodiments, the communications travel through one or more channels, including telephone systems, email systems, instant messaging systems, and the like. System analyzer 110 monitors one or more communication channels for any communication activity and stores communication data 206 in database 114 about, for example, when a telephone call is received, who placed the call, who answered the call, the duration of the call, the number of calls aggregated by person calling, person who answered, department, time period, the number of abandoned calls, the number and identity of all people required to resolve the issue for the call placer, how long after the first call was the problem resolved, where the call came from, where the call was routed to, how many calls an agent or user took per time period, and the like.

According to embodiments, such monitoring provides insight and information about how individuals interact outside the business, with the business, to potential customers or current customers, how people in the business use their time (including professionals that bill for time, such as, attorneys or accountants), or for a customer service or support organization, especially companies that provide services by or regarding telephone communications.

Figure 3:
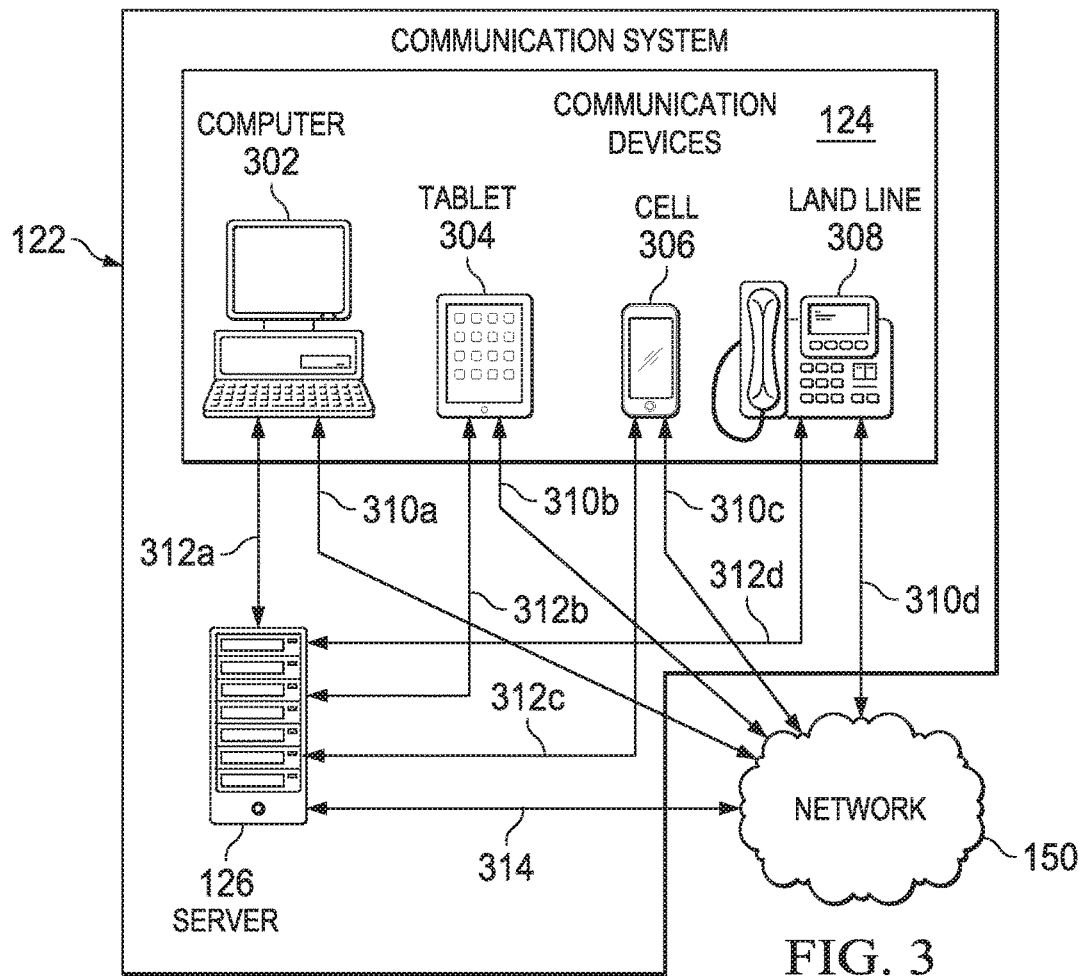
FIG. 3 illustrates the communication system of FIG. 1 according to an embodiment.

FIG. 3 illustrates communication systems 122a-122n of FIG. 1 in greater detail according to an embodiment. Communication systems 122a-122n may comprise communication devices 124, server 126, and/or communication links 310-314 which may be configured to communicate with network 150, system analyzer 110, one or more third parties 130, and cloud datastore 140. In one embodiment, one or more communication systems 122a-122n may each operate on separate computer systems or may operate on one or more shared computer systems. Each of these one or more computer systems may be a work station, personal computer (PC) 302, network computer, laptop computer, notebook computer, tablet-type device 304, smartphone 306, terminal, or any other suitable communication device 124. In addition, communication devices 124 may comprises a land-line or VoIP telephone 308.

One or more tablet-type devices 304, smartphones 306, and land-line or VoIP telephone 308 may comprise a processor, memory and data storage. The processor may execute an operating system program stored in memory to control the overall operation of one or more tablet-type devices 304 and/or smartphones 306. For example, the processor may control the reception of signals and the transmission of signals within communication analytics system 100. The processor may execute other processes and programs resident in memory, such as, for example, registration, identification or communication and moves data into or out of the memory, as required by an executing process.

Those skilled in the art will recognize that one or more specific examples of communication systems 122a-122n are given by way of example and that for simplicity and clarity, only so much of the construction and operation of one or more communication systems 122a-122n as is necessary for an understanding of the present invention is shown and described. Moreover, it is understood that one or more communication systems 122a-122n should not be construed to limit the types of devices in which embodiments of the present invention may be implemented. For example, one or more communication systems 122a-122n may be any device, including, but not limited to, conventional cellular or mobile telephones, smart mobile phones, an IPHONE™, an IPAD™, wireless tablet devices, paging devices, personal digital assistant devices, short message service (SMS) wireless devices, portable computers, or any other device capable of wireless or network communication.

According to embodiments, each of the one or more communication devices 124 may be assigned one or more identification numbers, such as IP addresses, serial numbers, or telephone numbers that may be used to identify communication devices 124. According to some embodiments, each communication device 124 is associated with an identification number, such as an IP or MAC address.

Communication analytics system 100 may then leverage the identity of communication devices 124 and communication activity over each communication device 124 to collect information about each communication, such as a telephone call, and information associated with the communication, such as talk time, call recipient, call initiator, number of calls to the same number, call location, and other like information, as described herein. Such information may then be leveraged to determine trends and goals, record time for business professionals, identify new or current customers, provide customer service and support, route received calls to the appropriate communication device 124, and other like embodiments.

For example and as discussed above, according to some embodiments, communication analytics system 100 monitors telephone calls received at a real estate office. When a telephone call is received, communication analytics system 100 may identify the caller (based on a telephone number stored in entity data 202) as a client of the real estate office and route the call directly to a real estate agent assigned to the client. Communication analytics system 100 may then record the duration of the call and store the communication activity.

Figure 4:
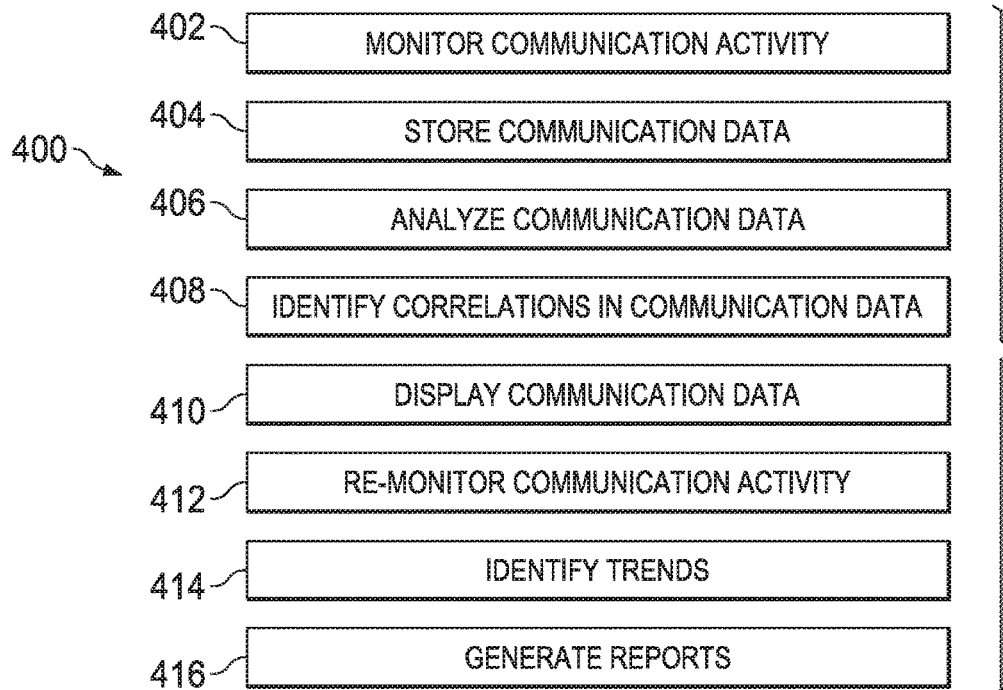
FIG. 4 illustrates an exemplary method of communication analysis.

FIG. 4 illustrates an exemplary method 400 of communication analysis. The process of a communication analysis proceeds by one or more activities, which although described in a particular order may be performed in one or more permutations, according to particular needs.

Method 400 begins at activity 402 where system analyzer 110 monitors one or more communication devices 124 and logs communication activity. As discussed above, communication activity may be received from one or more entities 120 and/or from one or more third parties 120. System analyzer 110 may work in connection with other systems and devices to automatically detect and monitor when a communication is initiated on a communication device 124 and initiate a log of communication activity for the communication device 124. For example, when a call is received, system analyzer 110 may record the time of the call, who placed the call, who received the call, the call duration, or other like communication activities, as described above. According to some embodiments, each communication activity is associated with one or more tickets, and logged in connection with ticket data 208.

At activity 404, system analyzer 110 stores communication activity as communication data 204 in database 114. Such storage may require large amounts of on-site or off-site data storage solutions owing to the enormous amount of data that may be collected for even a small business. Embodiments contemplate any suitable number or structure of local or remote data storage solutions to store communication data 206, such as for example, database 144 of cloud datastore 140.

At activity 406, system analyzer 110 analyzes communication data 204 and parses out various data points from the communication data 204. For example, system analyzer 110 may receive raw communication data 204, such as a log file, recorded conversations, time stamps, or the like and system analyzer 110 may decode, sort, and/or decompile communication data 204 into various data points or a standard data format. Such data points may comprise any suitable customization useful to analyze call data, such as, for example, any type of communication activity, communication metric, role, time aggregation or granularity, call type (inbound, outbound, answered call, missed call, voicemail, toll free call, international call, or the like), communication type (telephone, fax, text message, instant messaging, or the like), department, entity identification information, user identification information, telephone number, agents, location, or other features suitable for customization.

At activity 408, system analyzer 110 sorts communication data 204. System analyzer 110 may sort communication data 204 by various user-selected or automatic correlations. For example, system analyzer 110 may permit a user to select customizations or may automatically detect correlations in the communication data 206, and identify the correlations from the communication data 204. For example, system analyzer 110 may automatically identify each call that is an inbound call, and sort the inbound calls according to, for example, call recipient, department, employee, or the like. By way of a further example, system analyzer 110 may identify one or more users whose average call time is significantly longer or shorter than other users in a similar role. Other correlations may be identified by the system analyzer 110 or specified by a user, according to particular needs.

At activity 410, system analyzer 110 displays communication data 206 according to one or more charts, graphs, score cards, wall boards, spreadsheets, and/or reports. Such charts, graphs, score cards, wall boards, spreadsheets, and/or reports may be scheduled to be run according to user-selected criteria, such as customizations or correlations, at any suitable time period or upon a specified communication analytics system 100 action. In addition, or as an alternative, such charts, graphs, score cards, wall boards, spreadsheets, and/or reports may be customized by role type, such that, for example, a report for a CEO is customized according to the information that would be useful for the CEO to make decisions, and a report for a sales agent is customized according to the information that would be useful for a sales agent to increase sales.

FIG. 5 illustrates a hierarchy of communication systems 122a-122n in an exemplary entity 120. Each user of the one or more entities 120 may correlate to one or more communication devices 124 or communication systems 122a-122n. Each user may have one or more defined roles within the one or more entities 120. For example, a chief executive officer (CEO) 502 may have a primary role in the company. The CEO may have visibility settings and access to communication data 204 that is greater than that of members that are lower on the hierarchy. The CEO 502 may have one or more users that are lower in the hierarchy, such as, for example, a support manager 504, sales manager 506, and marketer 508. Each of the support manager 504, sales manager 506, and marketer 508, may have one or more users that are lower in the hierarchy. As illustrated, a sales manager 506 has three users lower in the hierarchy, a first agent 510a, a second agent 510b, and a third agent 510c. Although the user hierarchy is illustrates as comprising five roles distributed among seven users, embodiments contemplate any number of users or roles, sorted in any hierarchy, according to particular needs. Additionally, although each user is given one role, embodiments contemplate each user having any number of one or more roles, according to particular needs. For example, a CEO may also be a sales manager, and/or an agent 510a-510c may also be a support manager 504, sales manager 506, or marketer 508, or any other role, according to particular needs.

At activity 412, system analyzer 110 may re-monitor the communication channels to see if they are maintaining, losing, or gaining in one or more metrics. System analyzer 110 may automatically choose which metrics are analyzed according to correlations identified by system analyzer 110 at activity 408, or based, at least in part, on user-specified customizations or other criteria, as explained in connection with activity 408.

At activity 414, system analyzer 110 may identify trends within the communication channels by monitoring changes in communication data 206 according to customizations or correlations selected in activity 412. For example, when system analyzer 110 identifies that an agent's call time is longer than average, it may monitor that agent's future call times and determine if the agent's call times are increasing or decreasing in respect to the average call time. In this way, communication system 110 may generate reports on trends with regard to the performance of agents or departments within entity 120.

At activity 416, system analyzer 110 may generate one or more final reports that show improvements, losses, or lack of change for one or more customizations or correlations. According to some embodiments, system analyzer 110 may permit a user to compare information, and analyze communication data by a time period, such as, for example, per year, first quarter of this year against first quarter of last year, and compare information by users and the like, in an intuitive way. Embodiments contemplate permitting a user to schedule reports and generate scorecards that are easy to use and generate wall boards for a business. For example, one or more users of communication analytics system 100 may receive reports that indicate changes in communication metrics over a selected time period and improve decision-making for the users.

FIGS. 6-9 illustrate a graphical user interface 600 according to an embodiment. As discussed above, graphical user interface 600 provides for displaying, sorting, and reporting communication activity of one or more communication systems 120a-120n and/or one or more entities 120 of communication analytics system 100.

To further explain the operation of FIGS. 6-9 in communication analytics communication analytics system 100, an example is now given. In the following example, graphical user interface module 226 of a system analyzer 110 generates a graphical user interface 600. Communication systems 120a-120n and/or entity 120 uses graphical user interface 600 to display, chart, and sort communication activity and automate identification of trends and creation of reports of communication analytics system 100. As an example only and not by way of limitation, graphical user interface 600 provides communication systems 120a-120n and/or entity 120 with reporting, monitoring, analytics, and scheduled reports customized to role, time period, and various customizations, as explained in more detail below.

Figure 6:
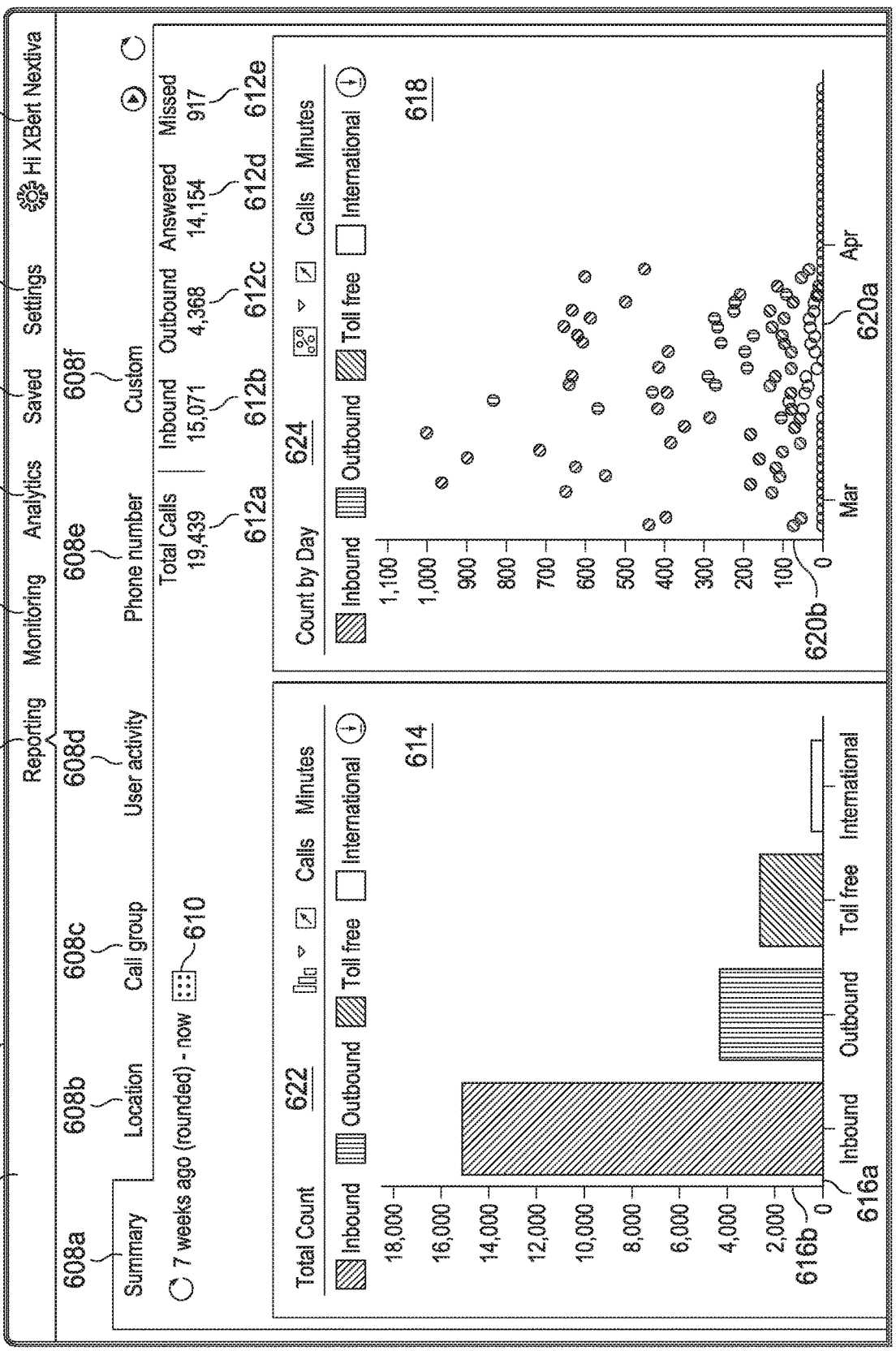
FIGS. 6-9 illustrate an exemplary graphical user interface according to embodiments.

In one embodiment, graphical user interface 600 of FIG. 6 comprises a menu bar 602 and display interface 606. Although particular elements are shown and described in association with graphical user interface 600, embodiments contemplate any one or more elements or features, according to particular needs.

Menu bar 602 comprises one or more user-selectable menu choices 604a-f. In some embodiments, these top-level menu choices 604a-f comprise: reporting 604a, monitoring 604b, analytics 604c, saved 604d, settings 604e, and user profile 604f (indicated by a gear icon in FIG. 6).

When menu choice 604a-604f is selected from menu bar 602, graphical user interface 600 is updated to display content representing that selection. For example, reporting 604a is selected from menu bar 602, a display interface 606 displays data and selections related to the selection, "Reporting."

Graphical user interface 600 comprises a dynamic area which displays text, buttons, text or number entry boxes, and/or other types of dynamic elements that are configurable to allow for the input, display, or configuration of reports, score cards, wallboards, or like elements of system 100. Alternatively, or in addition, graphical user interface 600 comprises a display interface 606, which in turn comprises tabs 608a-608f, period selection box 610, call counts 612a-612e, graph 614, and chart 618.

Tabs 608a-f provide for selection of various features of interface 600. For example, selection of summary 608a displays a summary of communication activity for one or more selected users and time periods, sorted by various customizations. According to embodiments, selection of a location tab 608b displays communication activity customized by location, and selection of call group tab 608c, user activity tab 608d, telephone number tab 608e, and custom tab 608f update display interface 606 to display communication activity customized by call group, user, telephone number, or customized criteria, respectively.

Display interface 606 may comprise period selection box 610 which permits configuration of display interface 606 to display communication activity related to a selected time period or for live updates. For example, as illustrated, the time period selected is at 24-hour period from May 14, 2015 at 8:55 PM to May 15, 2015 at 8:55 PM. Embodiments contemplate any suitable time period over any suitable duration, according to particular needs.

Display interface 606 may comprise call counts 612a-e. According to embodiments, call counts 612a-e comprise a tally of communication activity over a selected time period. For example, as illustrated, total calls 612a total 19,439 calls, inbound calls 612b total 15,071 calls, outbound calls 612c total 4,368 calls, answered calls 612d total 14,154 calls, and missed calls 612e total 917 calls. Although call counts 612a-e are illustrated as tallying telephone calls, embodiments contemplate tallies of any type of communication activity (including SMS, emails, faxes, or the like) sorted according to any attribute of the communication activity described herein.

Display interface 606 may comprise graph 614 and chart 618. Although display interface 606 is illustrated with a single graph 614 and a single chart 618, embodiments contemplate any suitable display of a combination of graphs or charts according to particular needs. For example, display interface 606 is illustrated as comprising a bar graph 614 and a scatter plot chart 618, but any suitable chart or graph may be displayed, such as, for example, a pie graph, line graph, table, or other like display of communication activity.

As illustrated, graph 614 displays communication activity for the selected time period sorted according to various call types: inbound calls, outbound calls, toll free calls, and international calls. The calls types are displayed across a first axis 616a and the number of calls are indicated by a second axis 616b. Although the number of calls are indicated by the second axis 616b, a graph selection box 622 permits configuring the graph 614 to display a total time of the communication activity (such as total minutes) or altering the type of information or graph displayed.

As illustrated, chart 618 displays a call count by day over a selected period at selectable granularity according to call type. For each day on the first axis 620a, the call count for types of calls is indicated by the second axis 620b. For example, chart 618 indicates that on April 20, approximately 80 toll-free calls were made and approximately 20 international calls were made. A chart selection box 624 permits customization of chart 624 by changing the second axis 620b to display a total time of the communication activity and customizing the chart according to one or more other various types of charts or display of communication activity, according to particular needs.

FIGS. 7A-7D illustrate graphical user interface 700 that displays communication activity and features of communication analytics system 100 relating to monitoring 604b. Upon selection of monitoring menu choice 604b, display interface 606 displays monitoring tabs 702a-702e and updates display interface 606 to display features and communication activity related to the selected monitoring tab 702a-702e. Monitoring tabs 702a-702e permit selection of various features of communication analytics system 100 related to monitoring communication activity. For example, selection of dashboard tab 702a causes display interface 606 to update and display dashboard 700. Selection of wallboards tab 702b, scorecards tab 702c, gamification tab 702d and custom tab 702e causes display interface 606 to display communication activity and features related to wallboards, scorecards, gamification and custom, respectively.

Figure 7A:
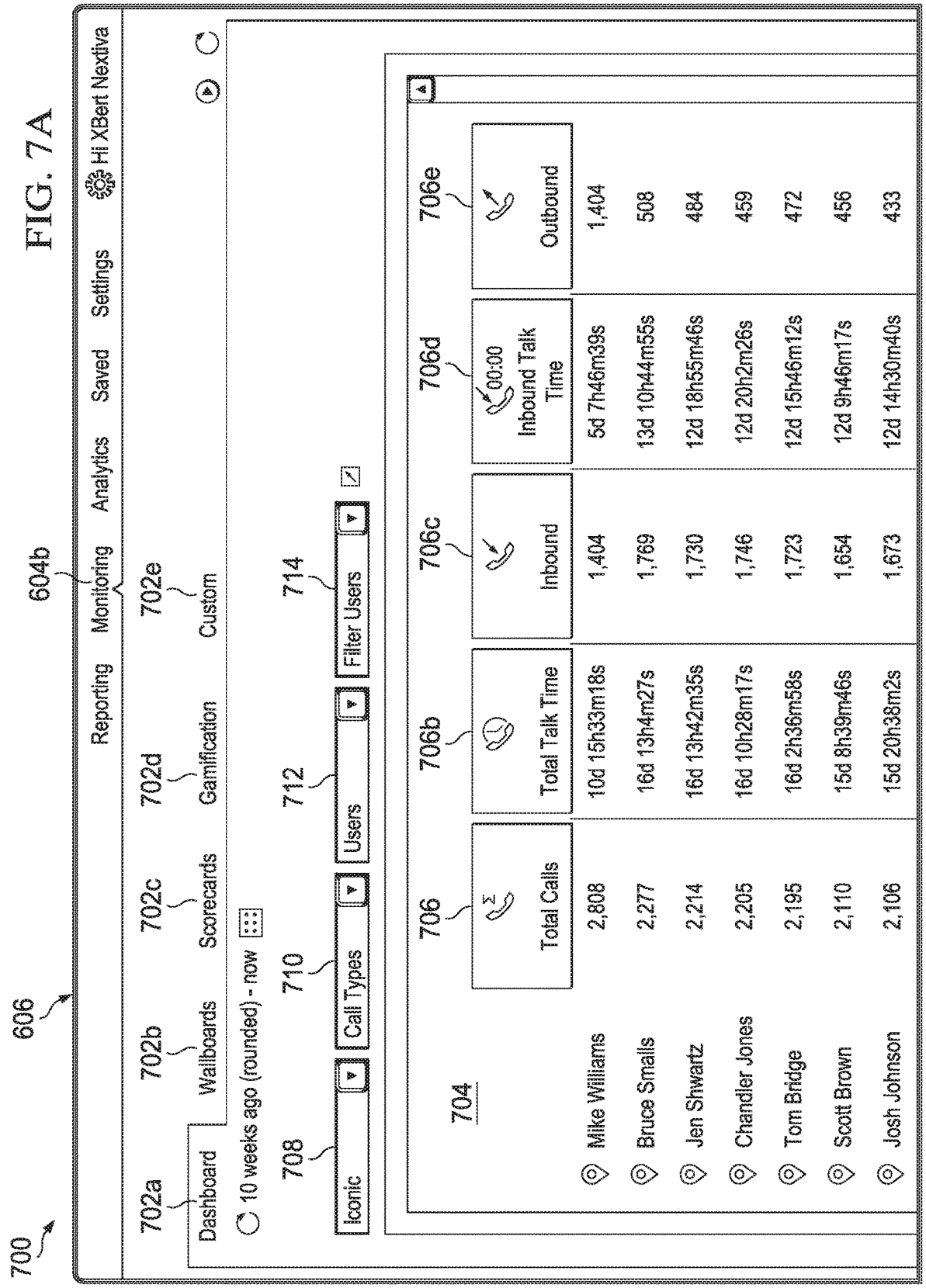

FIG. 7A illustrates a dashboard 700 according to an embodiment. Selection of dashboard tab 702a may cause display interface 606 to display dashboard tab 702a, comprising one or more agents 704 and one or more tiles 706a-706e. Tiles 706a-706e may comprise one or more counts, tallies, metrics, or other like customized communication activity, selected according to particular needs. The data displayed in tiles 706a-706e may be customized such as, for example, dashboard tab 702a comprises total number of calls tile 706a, total talk time tile 706b, inbound call count tile 706c, inbound talk time tile 706d and outbound call count tile 720e. Although particular tiles 706a-706e are shown and described, embodiments contemplate any suitable selection or combination of tiles 706a-706e, according to particular needs.

Dashboard 700 comprises a display selection box 708, a call types selection box 710, a users selection box 712, and a filter users selection box 714. Display selection box 708 comprises a dropdown box that permits a user to choose the type of display in dashboard tab 702a. For example, as illustrated, iconic is selected in display selection box 708, and the data is displayed in an iconic format in dashboard tab 702a. Other displays may be selected, according to particular needs. Based upon the selected display in display selection box 708, dashboard tab 702a displays metrics associated with communication activity related to the selected display. Dashboard tab 702a may be customized and may display metrics sorted according to various categories, such as, for example, agent 704, total number of calls 706a, total talk time 706b, inbound call count 706c, inbound talk time 706d and outbound call count 720e.

Call types selection box 710 comprises a dropdown box that permits a user to choose the type of call types in dashboard tab 702a. For example, as illustrated, particular call types are selected in call types selection box 710, and the data is displayed in a call type format in dashboard tab 702a. Based upon selected call types in call type selection box 708, dashboard tab 702a displays metrics associated with communication activity related to the selected call types. Dashboard tab 702a may be customized and may display metrics sorted according to various call types, such as, for example, total calls, total talk time, inbound calls, inbound talk time, outbound calls, outbound talk time, toll free calls, toll free talk time, international calls, international talk time, and the like.

User selection box 712 comprises a dropdown or text entry box that permits a user to choose the role of users displayed in dashboard tab 702a. For example, as illustrated, users is selected as the role in user selection box 704, and the data displayed in dashboard tab 702a relates to communication activity of communication systems 120a-120n that are associated with the "users" role. Other roles, such as, for example, may be locations, call groups, custom user, locations, call and phone number groups and may be selected according to particular needs. Based upon the selected role in user selection box 704, dashboard tab 702a displays metrics associated with communication activity related to the selected user. Dashboard tab 702a may be customized based upon a time period, department, or other like customizations.

Filter users selection box 714 comprises a dropdown box that permits a user to choose the users in dashboard tab 702a. For example, as illustrated, particular users are selected in display selection box 714, and the data is displayed for these particular users in dashboard tab 702a. Other users may be selected, according to particular needs. Based upon the selected users in display selection box 714, dashboard tab 702a displays metrics associated with communication activity related to the selected users.

Figure 7B:
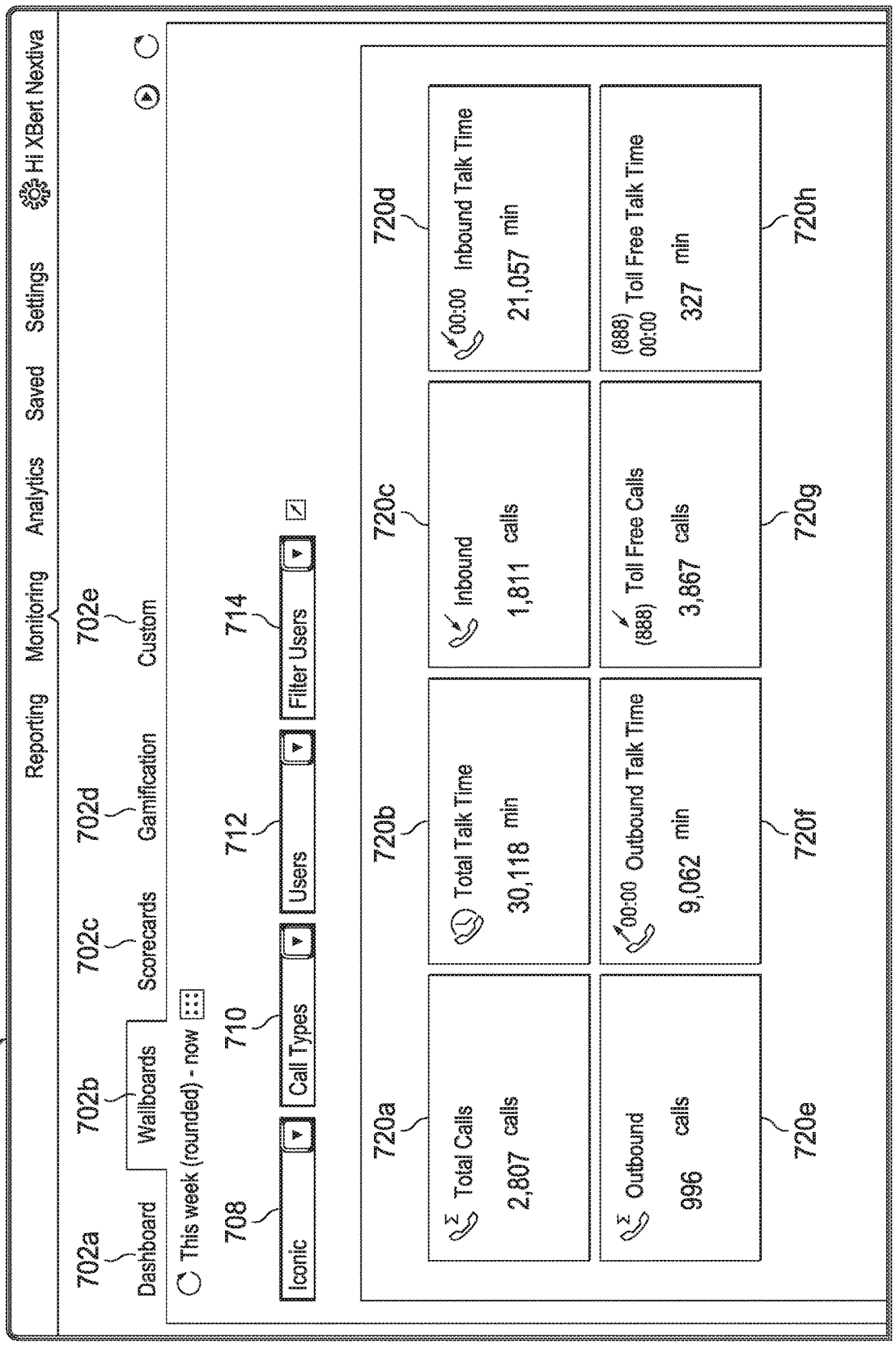

FIG. 7B illustrates dashboard 700 according to an embodiment. Selection of wallboards tab 702b may cause display interface 606 to display wallboards tab 702b, comprising one or more tiles 720a-720h.

Tiles 720a-720h may comprise one or more counts, tallies, metrics, or other like customized communication activity, selected according to particular needs. Tiles 720a-720h may permit viewing of an overview of communication activity, the setting of goals, and a quick determination if one or more goals are being met. The data displayed in tiles 720a-720h may be customized according to user, role-type, time period, call type, or other suitable customization. For example, as illustrated, wallboards tab 702a comprises a total number of calls tile 720a, total talk time count tile 720b, inbound call count tile 720c, inbound talk time tile 720d, outbound call count tile 720e, outbound talk time tile 720f, toll free calls count tile 720g, and toll free talk time tile 720h. Although particular tiles 720a-720h are shown and described, embodiments contemplate any suitable selection or combination of tiles 720a-720h, according to particular needs.

FIG. 7C illustrates dashboard 700 according to an embodiment. Selection of scorecards tab 702c may cause display interface 606 to display scorecards tab 702c, comprising one or more scorecards 730a-730b. In addition, as discussed above, scorecards tab 702c comprises a users selection box 712, a filter users selection box 714 and also comprises a summary selection box 716. Summary selection box 716 comprises a dropdown box that permits a user to choose the summary period in scorecards tab 702c. For example, as illustrated, the summary period is selected in summary selection box 716, and the data is displayed based on a time period format in scorecards tab 702c. Based upon the selected time period in summary selection box 716, scorecards tab 702c displays metrics associated with communication activity related to the selected time period. The metrics may be based on an agent and for example, the total number of calls, the total duration of calls, the average duration of calls, the longest call, the number of unique calls taken (calls from or to a unique number, the percentage of calls taken that were unique, the number of calls received, the number of calls received but not answered, the average talk time of the received calls that were answered and the like. Although particular metrics are shown and described, embodiments contemplate any metric or any type of metric, according to particular needs. Scorecards tab 702c may be customized and may display metrics sorted according to various time periods, such as, for example, daily, weekly, monthly, quarterly and the like.

Figure 7D:
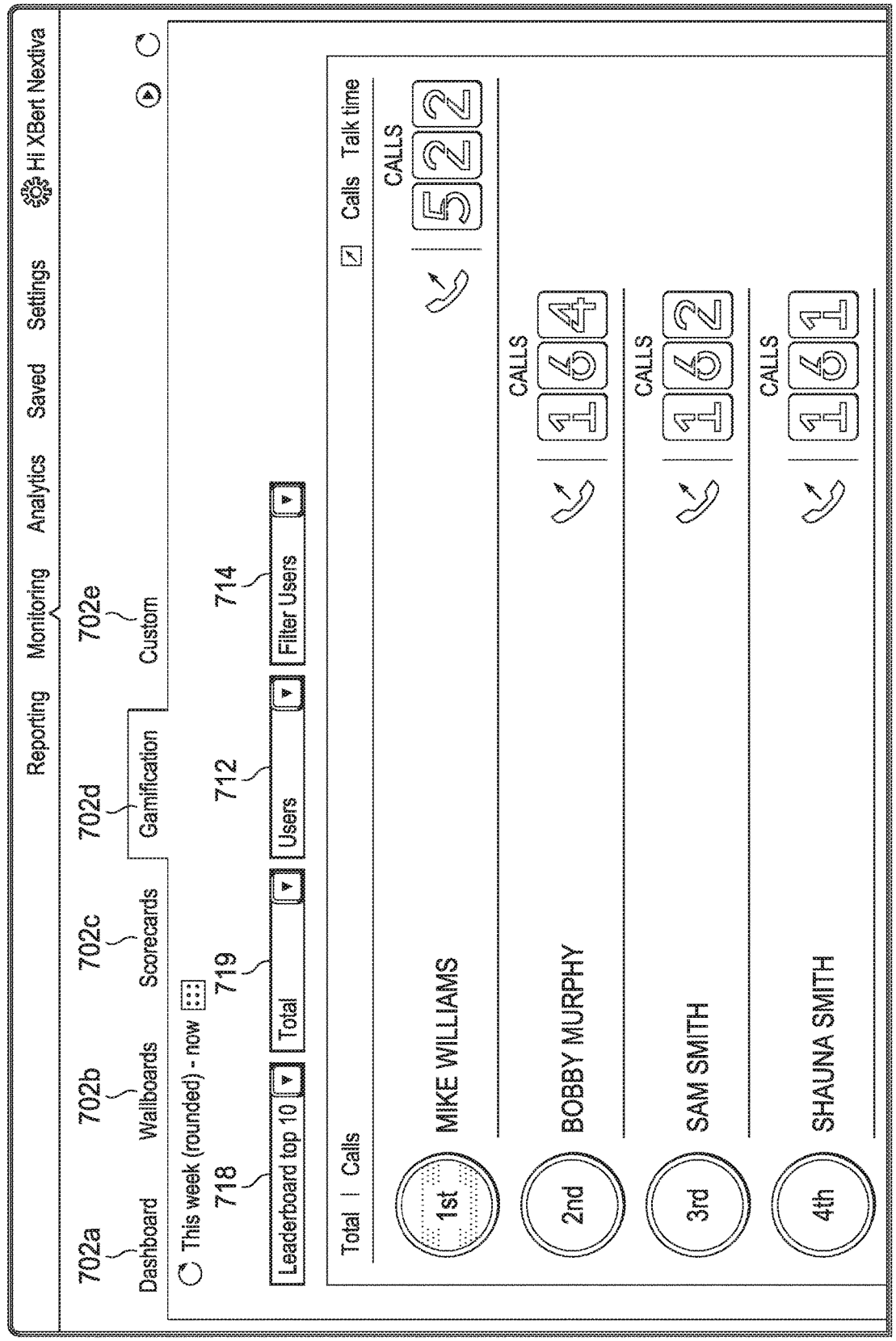

FIG. 7D illustrates dashboard 700 according to an embodiment. Selection of gamification tab 702d causes display interface 606 to display gamification tab 702d, comprising one or more gamification boards. In addition, as discussed above, gamification tab 702d comprises a users selection box 712, a filter users selection box 714 and also comprises a leaderboard selection box 718 and a total selection box 719. Leaderboard selection box 718 comprises a dropdown box that permits a user to choose the display of the gamification in gamification tab 702d. For example, as illustrated, the leaderboard top 10 is selected in leaderboard selection box 718, and the data is displayed based on a top 10 leader's format in gamification tab 702d. Also, based upon the selected total selection box 719, gamification tab 702d displays metrics associated with communication activity related to, for example, the total outbound calls or the total inbound calls. Gamification tab 702d may be customized and may display metrics sorted according to various leaderboards, such as, for example, original top 10, original top 5, retro top 10, retro top 5, leaderboard top 10, leaderboard top 5 and the like. As explained above, gamification tab 702d may be used for gamification to increase competition and performance among agents or sales representatives of one or more entities 120.

Figure 8:
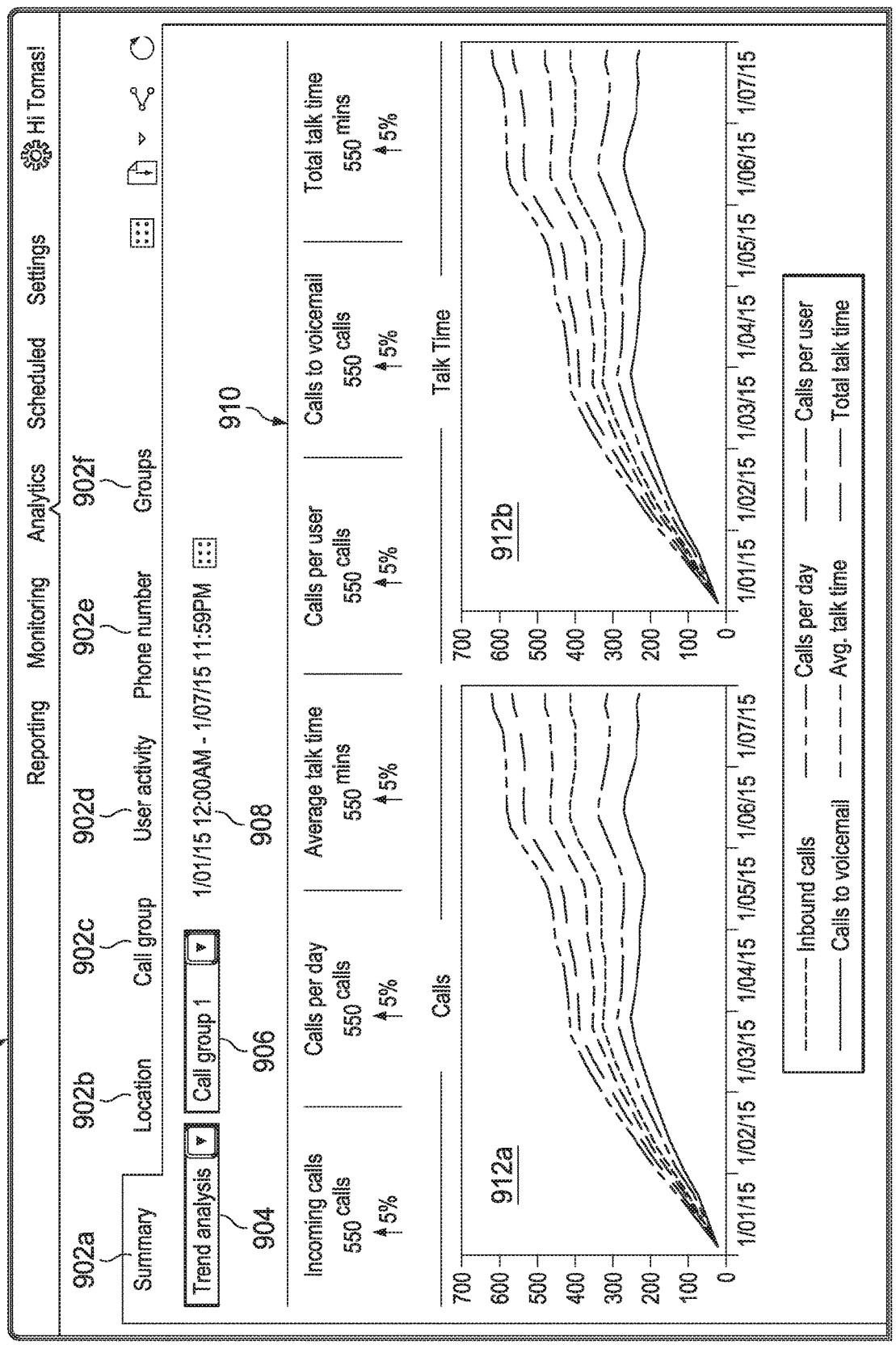

FIG. 8 illustrates a graphical user interface 900 that displays communication activity and features of communication analytics system 100 relating to trend analysis. Upon selection of analytics menu choice 604c, display interface 606 displays analytics tabs 902a-902f and updates display interface 606 to display features and communication activity related to the selected analytics tab 902a-902f.

Selection of the summary tab 902a displays a summary of communication activity customized according to various customizations such as, analysis type, call group, time period, and other like customizations. Display interface 606 may comprise, for example, a trend analysis type selection box 904, call group selection box 906, time period selector 908, communication metrics 910, and analytics charts 912a-912b.

Trend analysis type selection box 904 permits selection of one or more types of analyses to display in display interface 606. For example, trend analysis is selected in trend analysis type selection box 904 and display interface 606 displays communication metrics 910 and analytics charts 912a-912b relating to a trend analysis. Trend analysis type selection box 904 may also permit selection of a comparison analysis, such as period over period or call duration and display interface 606 will update to display communication metrics and analytics charts associated with a comparison analysis as discussed below in connection with FIG. 9.

Call group selection box 906 permits selection of one or more call groups to customize the display of communication metrics 910 and analytics charts 912a-912b. As an example only and not by way of limitation, call group selection box 906 may comprise custom groups associated with location tab 902b, call group tab 902c, user activity tab 902d, phone number tab 902e and groups tab 902f. Location tab 902b permits a user to choose the location or locations for the trend analysis selected with trend analysis type selection box 904. Locations may be customized and may display locations, such as, for example, by city, state, region and the like. Call group tab 902c permits a user to choose the call group or groups for the trend analysis selected with trend analysis type selection box 904. Call groups may be customized and may display call groups, such as, for example, by sales, support, website inquires and the like. User activity tab 902d permits a user to choose the user or users for the trend analysis selected with trend analysis type selection box 904. Phone number tab 902e permits a user to choose the phone number or phone numbers for the trend analysis selected with trend analysis type selection box 904. Groups tab 902e permits a user to choose the group or groups for the trend analysis selected with trend analysis type selection box 904. Groups may be customized and may display locations, such as, for example, by sales, sales teams, campaigns, support teams and the like.

As discussed above, one or more communication systems 122a-122n may be organized into various call groups or departments, and selection of a call group or department in call group selection box 906 displays communication metrics 910 and analytics charts 912a-912 relating to the selected call group or department. Time period selector 908 permits a time period to be selected over which the communication metrics 910 and analytics charts 912a-912b will display. As discussed above, a time period selector 908 permits selection of any suitable time period at any suitable granularity or aggregation, according to particular needs, such as, for example, average calls per hour, average minutes of talk time per hour, total number of calls, total number of hours, or other like granularity and aggregation.

Communication metrics 910 displays one or more metrics relating to communication activity for a trend analysis. For example, communication metrics 910 may display a count, tally, or total relating to one or more communication metrics and an associated indicator, such as a percentage and a direction, that indicates whether the metric is increasing, decreasing, or unchanging. As illustrated, for example, communication metrics 910 may comprise a count of 550 incoming calls over the period Jan. 1, 2016 12:00 AM until Jan. 7, 2016 at 11:59 PM for call group 1 and an associated indicator that indicates that the number of incoming calls has increased 5% over that period. Other communication metrics and indicators displayed comprise the number of calls per day, average talk time, calls per user, calls to voicemail, total talk time, and other like communication metrics and indicators.

Analytics charts 912a-912b permit the display and comparison of trends based on selected time periods, call groups, chart type, and other customizations. As illustrated, a first analytics chart 912a may comprise a display of the number of calls for various call types over each day for the selected time period. A second analytics chart 912b may comprise a display of the total talk time for various call types over each day for the selected time period. For each of the analytics charts 912a-912b, a user may select one or more metrics may be displayed as one or more graphs on the charts 912a-912b. For example, choosing inbound calls causes graphs 912a-912b to display communication data relating to only inbound calls. Similarly, choosing outbound calls causes graphs 912a-912 to display communication data relating to only outbound calls. Other customizations of communication data may be displayed according to particular needs.

According to some embodiments, communication metrics 910 and/or analytics charts 912a-912b display goals. Goals may be set in the settings module, and the goals may be displayed as indicators in communication metrics 910 or represented by lines on analytics charts 912a-b. Goals may comprise, for example, setting a minimum number of calls per hour, minimum number of talk time minutes per hour, or any other suitable goal.

Figure 9:
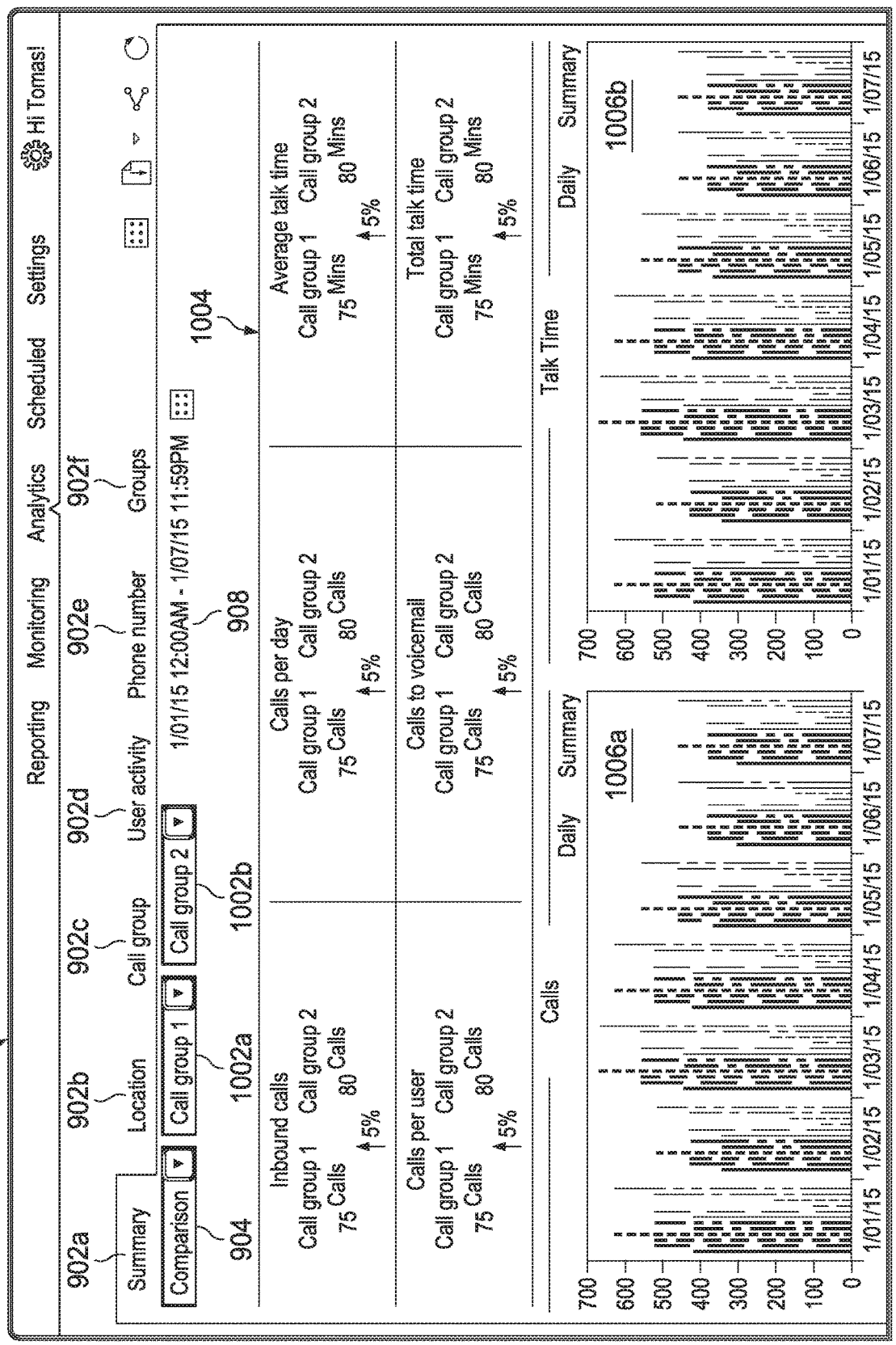

FIG. 9 illustrates a graphical user interface 1000 that displays communication activity and features of communication analytics system 100 relating to comparison analysis. Upon selection of analytics menu choice 604c, display interface 606 displays analytics tabs 902a-902f and updates display interface 606 to display features and communication activity related to the selected analytics tab 902a-902f.

Upon selection of comparison in trend analysis type selection box 904, display interface 606 displays communication metrics and analytics charts associated with a comparison analysis. Display interface 606 for a comparison analysis may comprise trend analysis type selection box 904, call group selectors 1002a-1002b, time period selector 908, communication comparison metrics 1004, and comparison charts 1006a-1006b.

Call group selectors 1002a-1002b permit selection of a first group by a first call group selector 1002a and a second group by a second call group selector 1002b to display a comparison between communication activity between the first call group and the second call group in communication comparison metrics 1004 and comparison charts 1006a-1006b. For example, call group 1 has been selected in the first call group selector 1002a and call group 2 has been selected in the second call group selector 1002b. Accordingly, communication comparison metrics 1004 displays communication metrics and indicators related to a comparison of the first and second selected call groups. According to embodiments, communication comparison metrics 1004 displays a comparison and indicator for inbound calls, calls per day, average talk time, calls per user, calls to voicemail, total talk time, and other like metrics.

For example, as illustrated, call group 1 has made 75 inbound calls, and call group 2 has made 80 calls. An indicator associated with the communication comparison metric shows that the percentage increase from call group 1 to call group 2 is approximately 6.6%.

Comparison charts 1006a-1006b may display a comparison between the first call group and the second call group in chart form over the selected time period and sorted by one or more customizations. For example, a first comparison chart 1006a illustrates a summary of daily calls for one or more call types. In the first comparison chart 1006a, various call types are tallied and compared in a bar graph format, where a first call groups calls are illustrated in a shaded bar of the same color as the second call groups calls. As illustrated, inbound calls of a first call group are indicated by a first color and total approximately 420 calls on Jan. 1, 2015, inbound calls of a second call group are indicated by a second color and total approximately 510 calls on Jan. 1, 2015. In this manner, a user may be able to quickly identify trends and comparisons between one or more call groups for various days and among various call types.

Additionally, a second comparison chart 1006b indicates a comparison of talk time for various call types between a first call group and a second call group organized by various call types. For example, outbound calls of a first call group have a total talk time of approximately 510 minutes on Jan. 4, 2015, and outbound calls of a second call group have a total talk time of approximately 620 minutes on Jan. 4, 2015. In this manner, a user may be able to quickly identify trends and comparisons between one or more call groups for various days and among various call types.

Although comparison charts 1006a-1006b are illustrated as comprising two groups, various types of calls, particular aggregations and granularity, for a particular time period, embodiments contemplate any number of comparison of groups, any type of communication data or metrics, aggregated or granulized by any particular value, and any suitable time period, according to particular needs. For example, calls and talk time may be organized by, for example, location, telephone number, call groups, users, individuals, marketing area, area code, user activity, ticket data, or any other like aggregation or customization of data.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A communication analytics system, comprising:
   a computer, comprising a processor and memory, the computer configured to:
      receive communication data from a communication system, the communication system comprising one or more communication devices associated with an entity;
      receive customer relationship management (CRM) data from a CRM system associated with the entity;
      integrate the received communication data with the received CRM data;
      calculate one or more communication metrics based, at least in part, on the integrated communication and CRM data; and
      display one or more analytics, the one or more analytics based, at least in part, on the calculated communication metrics.

2. The communication analytics system of claim 1, wherein the received communication data comprises communication activity between one or more third parties and the entity.

3. The communication analytics system of claim 2, wherein the computer is further configured to:
   monitor communication activity between the one or more third parties and the entity; and
   improve service from the entity to the one or more third parties using communication data generated from the monitored communication activity.

4. The communication analytics system of claim 3, wherein improve service from the entity to the one or more third parties comprises:
   determining a nature of a service request in a communication from a third party; and
   routing the communication to a customer service representative who resolves service requests having the same nature as the third party service request more quickly than one or more other customer service representatives.

5. The communication analytics system of claim 4, wherein the computer is further configured to:
   generate an automated response to the service request in the communication; and
   transmit the automated response to the third party in response to, and based at least in part on, determining the nature of the service request in the communication from the third party.

6. The communication analytics system of claim 5, wherein the computer is further configured to:
   monitor communication activity of an entity location;
   analyze ingoing and outgoing communications of the communication activity of the entity location; and
   prioritize an order of contacting one or more third parties based, at least in part, on the analyzed communications of the entity location.

7. The communication analytics system of claim 6, wherein prioritizing the order of contacting the one or more third parties comprises assigning to a customer service representative a call time and an identity of a group of one or more third parties.

8. A method of communication analytics, comprising:
   receiving communication data from a communication system, the communication system comprising one or more communication devices associated with an entity;
   receiving customer relationship management (CRM) data from a CRM system associated with the entity;

integrating the received communication data with the received CRM data;

calculating one or more communication metrics based, at least in part, on the integrated communication and CRM data; and displaying one or more analytics, the one or more analytics based, at least in part, on the calculated communication metrics.

9. The method of claim 8, wherein the received communication data comprises communication activity between one or more third parties and the entity.

10. The method of claim 9, further comprising:
monitoring communication activity between the one or more third parties and the entity; and
improving service from the entity to the one or more third parties using communication data generated from the monitored communication activity.

11. The method of claim 3, wherein improving service from the entity to the one or more third parties comprises:
determining a nature of a service request in a communication from a third party; and
routing the communication to a customer service representative who resolves service requests having the same nature as the third party service request more quickly than one or more other customer service representatives.

12. The method of claim 11, further comprising:
generating an automated response to the service request in the communication; and
transmitting the automated response to the third party in response to, and based at least in part on, determining the nature of the service request in the communication from the third party.

13. The method of claim 12, further comprising:
monitoring communication activity of an entity location;
analyzing ingoing and outgoing communications of the communication activity of the entity location; and
prioritizing an order of contacting one or more third parties based, at least in part, on the analyzed communications of the entity location.

14. The method of claim 13, wherein prioritizing the order of contacting the one or more third parties comprises assigning to a customer service representative a call time and an identity of a group of one or more third parties.

15. A non-transitory computer-readable medium embodied with communication analytics software, the software when executed:
receives communication data from a communication system, the communication system comprising one or more communication devices associated with an entity;
receives customer relationship management (CRM) data from a CRM system associated with the entity;
integrates the received communication data with the received CRM data;
calculates one or more communication metrics based, at least in part, on the integrated communication and CRM data; and
displays one or more analytics, the one or more analytics based, at least in part, on the calculated communication metrics.

16. The non-transitory computer-readable medium of claim 15, wherein the received communication data comprises communication activity between one or more third parties and the entity.

17. The non-transitory computer-readable medium of claim 16, wherein the software when executed further:
monitors communication activity between the one or more third parties and the entity; and
improves service from the entity to the one or more third parties using communication data generated from the monitored communication activity.

18. The non-transitory computer-readable medium of claim 17, wherein improves service from the entity to the one or more third parties comprises:
determining a nature of a service request in a communication from a third party; and
routing the communication to a customer service representative who resolves service requests having the same nature as the third party service request more quickly than one or more other customer service representatives.

19. The non-transitory computer-readable medium of claim 18, wherein the software when executed further:
generates an automated response to the service request in the communication; and
transmits the automated response to the third party in response to, and based at least in part on, determining the nature of the service request in the communication from the third party.

20. The non-transitory computer-readable medium of claim 19, wherein the software when executed further:
monitors communication activity of an entity location;
analyzes ingoing and outgoing communications of the communication activity of the entity location; and
prioritizes an order of contacting one or more third parties based, at least in part, on the analyzed communications of the entity location.

* * * * *